(12) United States Patent
Hudis et al.

(10) Patent No.: US 6,556,425 B2
(45) Date of Patent: *Apr. 29, 2003

(54) CAPACITOR MOUNTING

(75) Inventors: Martin Hudis, Mattapoisett, MA (US); Glenn Grenier, North Dartmouth, MA (US); David Jenkins, West Wareham, MA (US)

(73) Assignee: Parallax Power Components, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/562,422

(22) Filed: May 1, 2000

(65) Prior Publication Data

US 2002/0006025 A1 Jan. 17, 2002

Related U.S. Application Data

(63) Continuation-in-part of application No. 09/348,420, filed on Jul. 7, 1999, now abandoned.
(60) Provisional application No. 60/131,780, filed on Apr. 30, 1999.

(51) Int. Cl.[7] .............................................. H01G 2/10
(52) U.S. Cl. ........................................ 361/517; 361/535
(58) Field of Search .............................. 361/517, 518, 361/519, 520, 535, 536, 537

(56) References Cited

U.S. PATENT DOCUMENTS

| | | | | |
|---|---|---|---|---|
| 2,460,903 A | * | 2/1949 | Peck | |
| 2,790,111 A | * | 4/1957 | Calling | |
| 3,030,532 A | | 4/1962 | Costello | ........................ 310/72 |
| 3,619,641 A | * | 11/1971 | Ballard | ........................ 307/149 |
| 3,810,252 A | | 5/1974 | Leister et al. | |
| 5,493,158 A | | 2/1996 | Daniels | ..................... 310/68 R |

\* cited by examiner

*Primary Examiner*—Anthony Dinkins
(74) *Attorney, Agent, or Firm*—Fish & Richardson P.C.

(57) ABSTRACT

A simpler, lower-cost way of installing polymer capacitor canisters on motors and other equipment. A bracket and/or fastener is attached to the canister (e.g., by ultrasonic welding a polymer fastener or bracket directly to the polymer canister), and the fastener and/or bracket are used to make the connection between the canister and the equipment. E.g., fasteners may be chosen so that they mate with holes or matching fasteners on the equipment to which the capacitor is being attached. Depending on choice of fastener, installation of the capacitor becomes a simple snap-in action. The capacitor manufacturer can now easily manufacture capacitors with a wide range of built-in fastener arrangements, relieving the equipment manufacturer of most of the work formerly associated with installing a capacitor on equipment.

17 Claims, 6 Drawing Sheets

CAPACITOR MOUNTING

RELATED APPLICATIONS

This application is a continuation in part of U.S. application Ser. No. 09/348,420, filed Jul. 7, 1999 now abandoned, which claims priority from U.S. Provisional Application No. 60/131,780, filed Apr. 30, 1999.

BACKGROUND OF THE INVENTION

The invention relates to apparatus and methods for manufacturing capacitors and for mounting capacitors on motors and other equipment.

Large capacitors of the type having a cylindrical or oval canister are typically installed on motors, power supplies, lighting fixtures, and other equipment using special covers or brackets. For example, capacitors are installed on the outside of motors using a "dog house" cover made from sheet metal. The capacitor canister is inserted into the open side of the cover, and held in place by protrusions matching the shape of the canister. The cover, with canister installed, is then screwed down to the motor housing. One such cover is shown in U.S. Pat. No. 3,030,532. Metal or plastic straps are also used; a strap extends around the body of the capacitor canister, and its ends are fastened to the equipment to which the capacitor is being attached.

Typically, capacitor canisters are manufactured in a relatively small range of sizes and shapes, and the equipment manufacturer is responsible for custom designing the dog house, strap, or installation brackets to adapt one of the canister shapes to its particular equipment. The capacitor canister is often made from polymer (e.g., polypropylene).

SUMMARY OF THE INVENTION

We have discovered a simpler, lower-cost way of installing polymer capacitor canisters on motors and other equipment. A bracket and/or fastener is attached to the canister (e.g., by ultrasonic welding a polymer fastener or bracket directly to the polymer canister), and the fastener and/or bracket are used to make the connection between the canister and the equipment. E.g., fasteners may be chosen so that they mate with holes or matching fasteners on the equipment to which the capacitor is being attached. Depending on choice of fastener, installation of the capacitor becomes a simple snap-in action. The capacitor manufacturer can now easily manufacture capacitors with a wide range of built-in fastener arrangements, relieving the equipment manufacturer of most of the work formerly associated with installing a capacitor on equipment.

In a first aspect, the invention features a capacitor with a polymer canister comprising a polymer wall surrounding a capacitive element. In one configuration, at least one fastener is supported on the exterior surface of the polymer wall. The capacitor fastener is configured to attach the canister to the equipment in which the capacitor is to be installed. Alternatively, a bracket may be adhered (e.g., by ultrasonic welding) to the exterior surface of the polymer wall, and the bracket configured to support a fastener.

One or more of the following features may preferably be used in preferred embodiments of this aspect of the invention. A bracket may be provided with openings for receiving fasteners extending from the equipment (instead of providing the fasteners on the canister). The fastener may be a male fastener and be attached to the bracket prior to installation of the capacitor in the equipment. The fastener may be a female fastener configured to mate with a male fastener attached to the equipment. The bracket may have at least one hole through which the at least one fastener extends, and the bracket may have a cavity on its rear surface (which faces the canister wall), and the cavity may be sized and configured to hold the head of the fastener. The canister may have at least one curved surface, and the bracket may be adhered to the curved surface. The canister may be approximately cylindrical (circular or oval in cross section), the bracket may be elongated, and the long dimension of the bracket may run in the longitudinal direction of the cylinder. The bracket may be ultrasonically welded to the canister wall. The bracket and polymer may be made primarily of polypropylene. The bracket may have an opening for receiving a fastener configured to clamp the bracket to the equipment. The bracket may have a slot with a variable radial distance from the centerline of the canister, and the slot may be configured to receive a fastener and to cause the fastener to be forced radially against the wall of the slot when the canister is rotated about the centerline to move the fastener along the length of the slot. At the end of the slot at which the slot is radially closest to the centerline of the canister, the slot may be wider than at the other end, thereby easing reception of the fastener within the slot. At least one resilient element (e.g., a wing-like extension) may be included on the bracket, with the element being configured to press against the equipment when the capacitor is installed to reduce vibration.

In a second aspect, the invention features a method of manufacturing capacitors of the type in which a capacitive element is housed in a polymer canister, which is, in turn, installed in equipment. The capacitors are manufactured with canisters of a small number of sizes and shapes. The manufactured capacitors are stored in inventory without attaching fasteners for attaching the canister to the equipment. A specification is received of the type, location, and size of fastener that an equipment manufacturer desires to use to attach the canister to the equipment. The manufactured capacitors are removed from inventory, and the fasteners as specified are attached to the canister.

One or more of the following features may preferably be used in preferred embodiments of this aspect of the invention. The fasteners may be connected to the canister by adhering a bracket to the canister, with the bracket providing support for the fasteners. Different sizes and types of fasteners may be used with the same bracket.

Other features and advantages of the invention will be apparent from the following description of preferred embodiments and from the claims.

DETAILED DESCRIPTION

Figure 1:
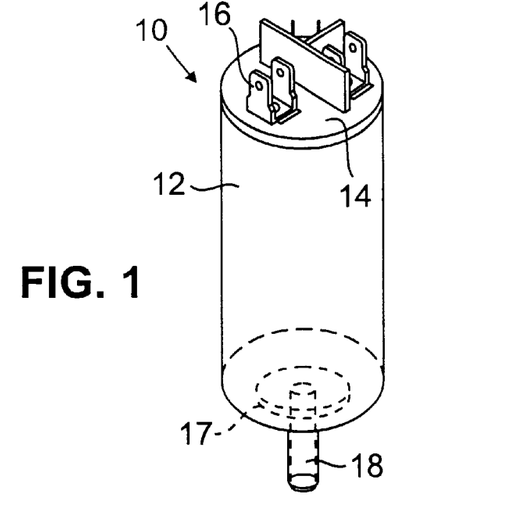
FIGS. 1–5 are isometric views of five preferred embodiments of the invention.
Figure 5:
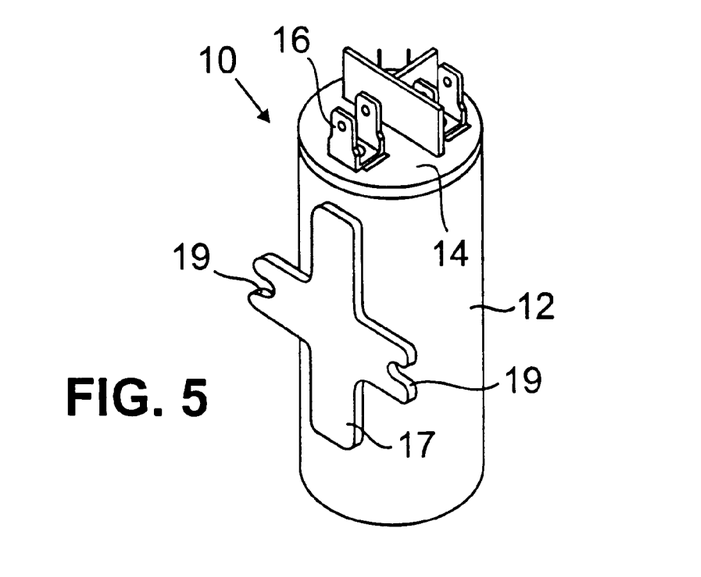
Figure 9:
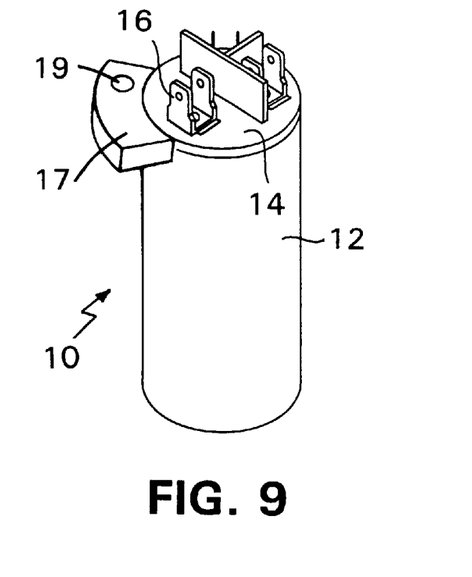
FIGS. 9–10 are an isometric view and a top view of a sixth embodiment of the invention.
Figure 10:
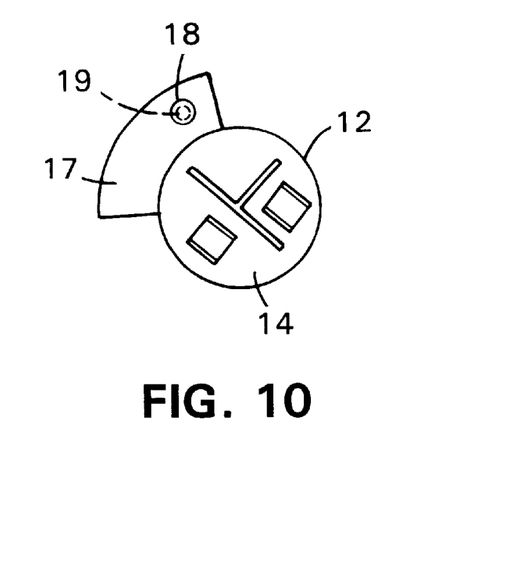

FIGS. 1–5 and 9–12 show seven alternative embodiments of the invention. In each embodiment, the capacitor canister 10, which consists of cylindrical housing 12, cover 14, spade electrical connectors 16, and an internal capacitive element (not shown), has adhered to it a bracket 17 and one or more fasteners 18. In FIGS. 5, 9, and 10, only bracket 17 appears, as male fasteners would project from the equipment to which the canister is being attached (e.g., FIGS. 5 and 10) or be supplied at the time of installation (e.g., FIG. 9). The male fasteners would be received in openings or slots 19 in the bracket. In FIG. 1, fastener 18 projects downwardly from the base of the canister (bracket 17 appears in dashed lines, as it is on the bottom surface of the canister).

Figure 6:
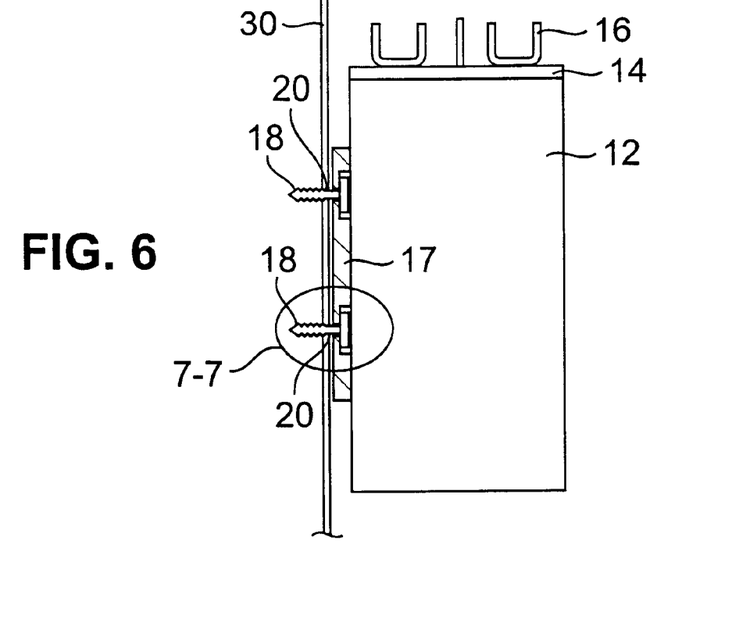
FIG. 6 is an elevation view of the embodiment FIG. 2 installed on a piece of equipment.

Fasteners 18 mate with holes 20 or matching fasteners on the equipment to which the canister is to be attached. For example, FIGS. 6 and 7 (an enlargement of one area of FIG. 6) shows the embodiment of FIG. 2 installed on wall 30 of a piece of equipment. Holes 20 in the wall are sized so that simply pressing fasteners 18 into the holes achieves a secure attachment.

Figure 7:
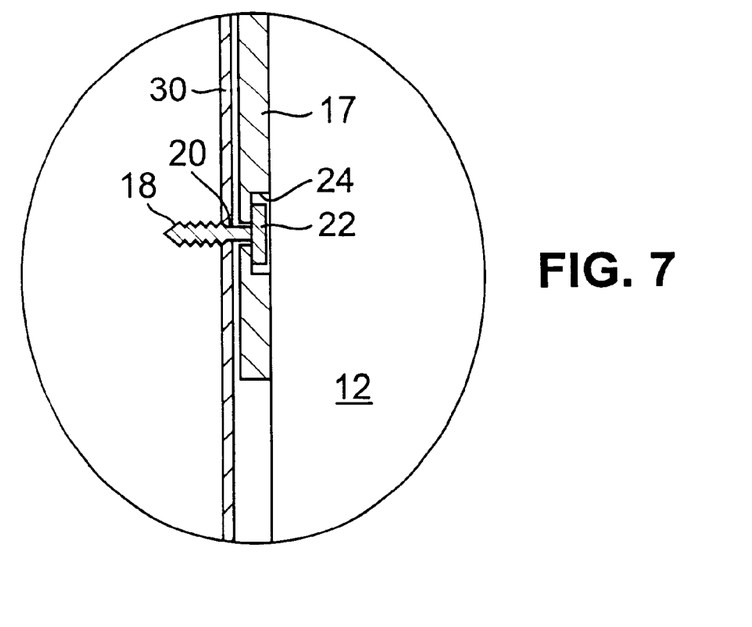
FIG. 7 is an enlarged view in the vicinity of one of the fasteners of FIG. 6.

As shown in FIG. 7, fasteners 18 each have a head 22 that is captured within cavity 24 of bracket 17. The fastener is installed before bracket 17 is ultrasonically welded to the canister 12. This permits a range of different size and type fasteners to be used with the same bracket, and allows the capacitor manufacturer to sell the same capacitor canister with a wide range of different fasteners.

Figure 14:
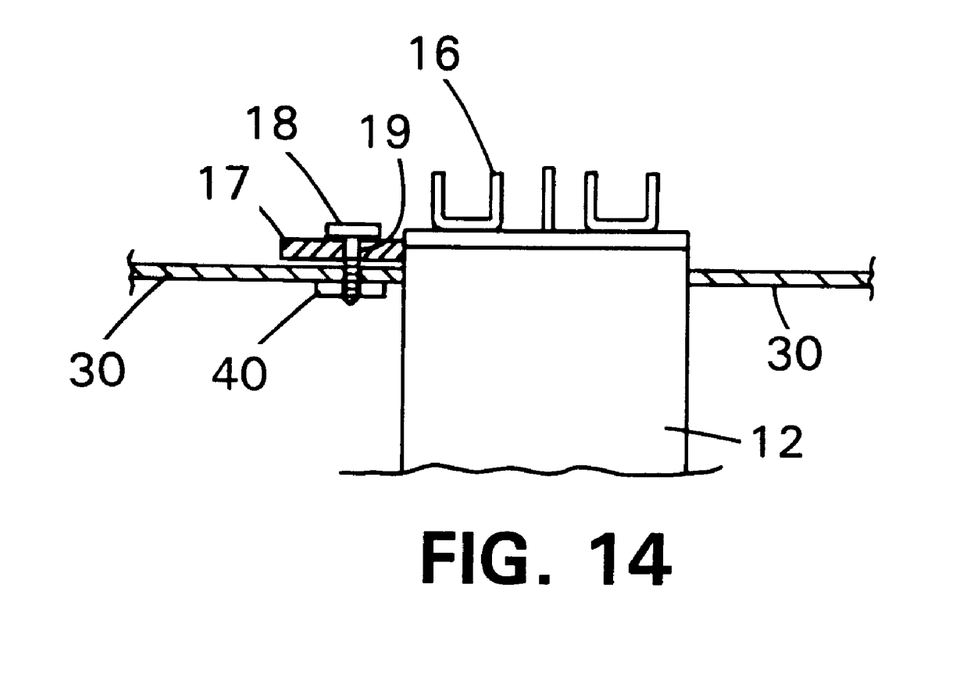
FIG. 14 is a section view of the embodiment of FIGS. 9–10 installed on a wall of a piece of equipment.

FIG. 14 shows the embodiment of FIGS. 9–10 installed on wall 30 of a piece of equipment. Fastener 18 (e.g., a screw) is installed through opening 19 in bracket 17, and secured to mating female fastener 40 on the opposite surface of wall 30.

Figure 11:
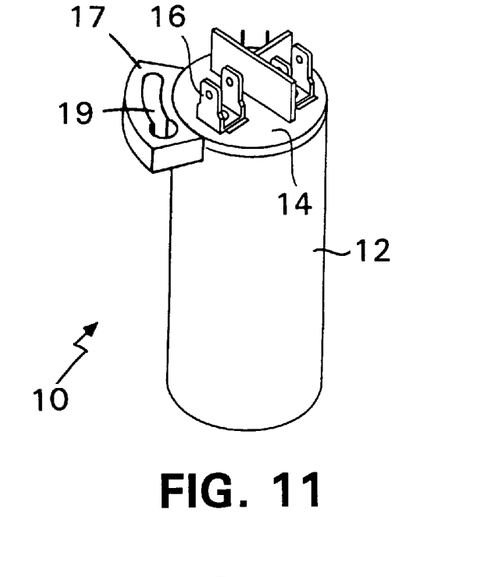
FIGS. 11–12 are an isometric view and a top view of a seventh (twist-and-lock) embodiment of the invention.
Figure 12:
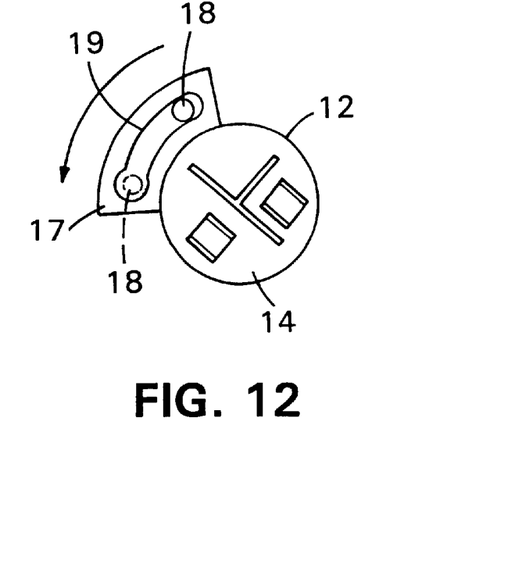

The twist-and-lock embodiment of FIGS. 11–12 is similar to the embodiment of FIGS. 9–10 except that instead of providing an opening 19 through which a fastener 18 is inserted at the time of installation, an elongated slot 19 is provided in the bracket for receiving a fastener extending from the wall of the equipment. The slot is configured so that it is located at a further radial distance from the centerline of the canister at one end than at the other. During installation of the capacitor, fastener 18 is received at the radially closer end of the slot, and the capacitor is turned radially. This forces the fastener to press tightly (in a radial direction) against the wall of the slot, holding the capacitor in place by friction. The slot may be wider at the end at which it is radially closer to ease reception of the fastener at that end. A variation of this embodiment would place slot 19 on a wall of the equipment, and provide the fastener on the canister.

Combinations of the twist-and-lock approach of FIGS. 11–12 and the simpler screw-down approach of FIGS. 9–10 and 14 may be used.

Figure 2:
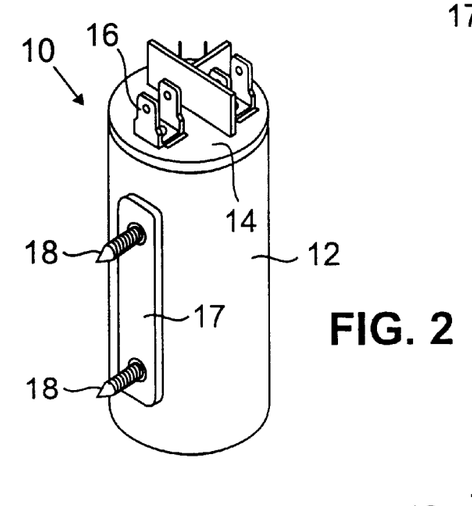
Figure 3:
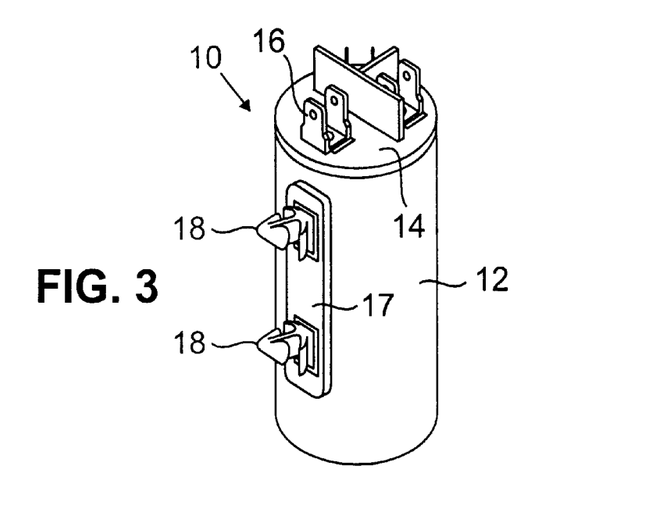
Figure 4:
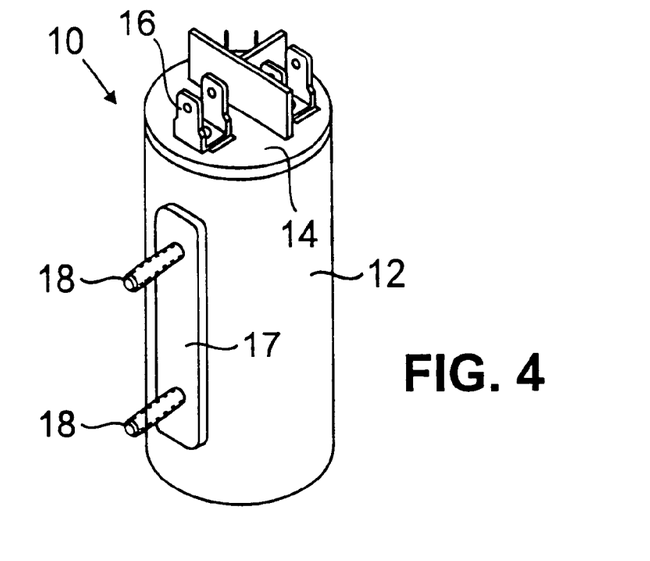
Figure 13:
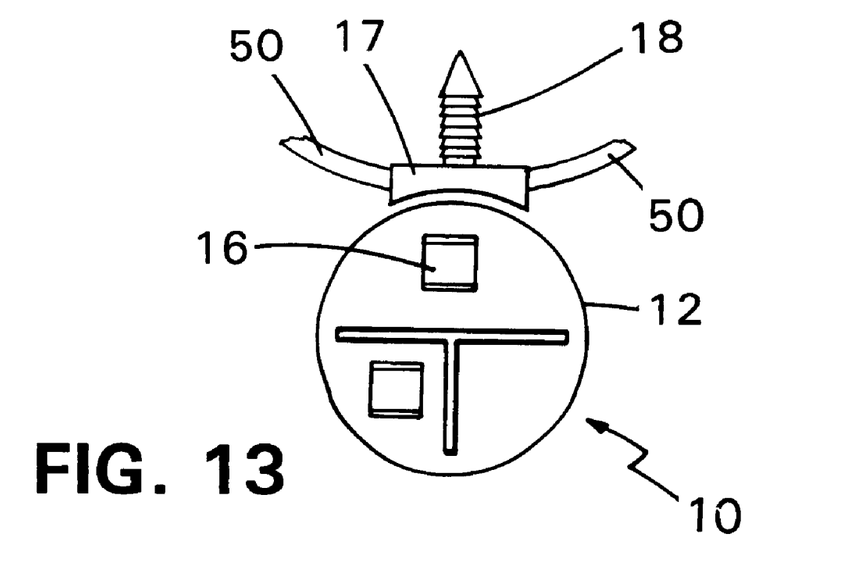
FIG. 13 is a top view of a variation of the embodiment shown in FIG. 2.

FIG. 13 shows a variation of the embodiment of FIG. 2. Anti-vibration elements 50 may be added to bracket 17, so that when the bracket is installed, elements 50 are pressed tightly against the surface of the wall of the equipment to which the capacitor is attached. Elements 50 should be resilient so that a more or less constant pressure is maintained by them against a surface of the equipment. A great many other shapes could be used for a resilient element 50, other than the extension or wing shown in FIG. 13.

Figure 8:
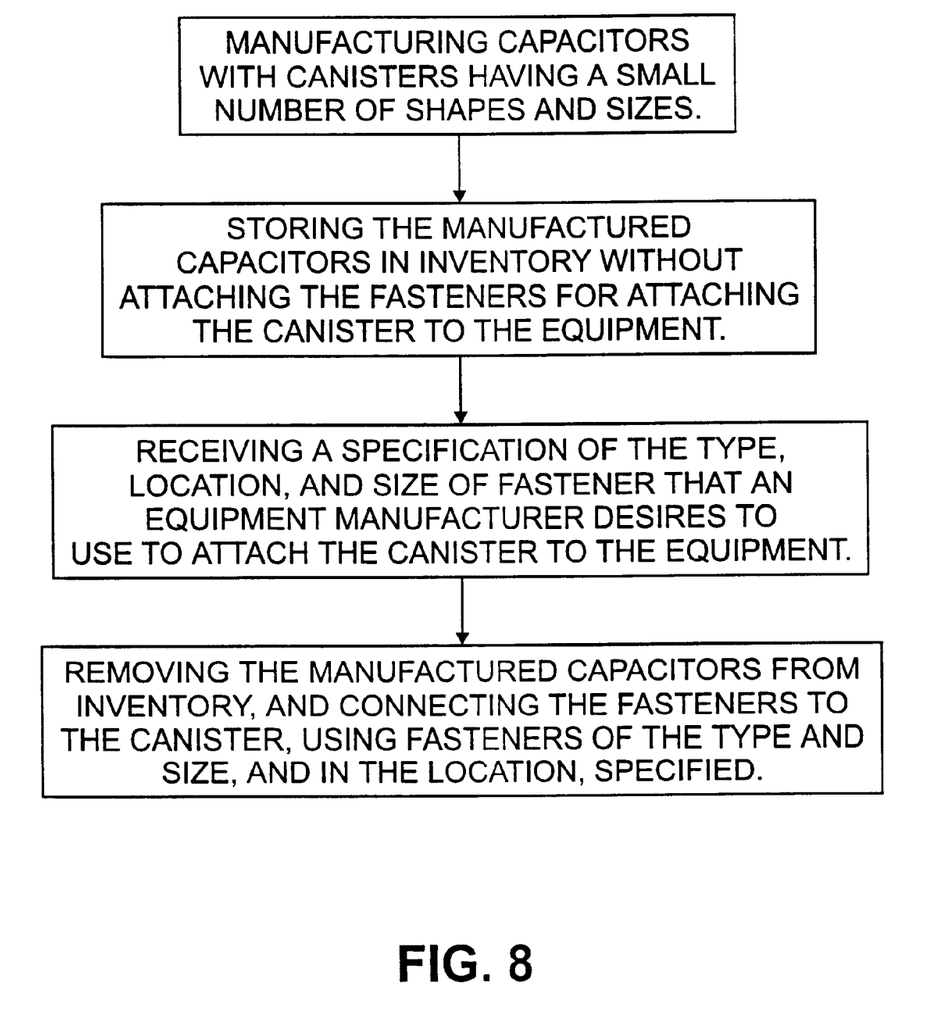
FIG. 8 is a flow diagram of the steps of manufacturing a capacitor with fastener arrangement customized for a particular customer's requirements.

As shown in FIG. 8, a capacitor manufacturer making use of the invention would typically manufacture capacitor canisters in only a small number of different sizes and shapes. These limited sizes and shapes would be stored in inventory. Customers would specify to the capacitor manufacturer the size, type, and location of the fastener or fasteners that they would like to have on the capacitor canisters. The capacitor manufacturer would select a bracket and fasteners that meet the customers specifications and then ultrasonically weld the bracket and fasteners to the chosen capacitor canister. By maintaining an inventory of brackets and fasteners, the capacitor manufacturer is able to quickly and easily provide its customers with a wide range of fastener configurations, while continuing to manufacturer only a limited range of canister sizes and shapes.

Ultrasonic welding of the brackets 17 to the canisters is done using conventional ultrasonic welding techniques. For example, ridges (energy directors) that focus ultrasonic energy are molded into the surfaces that are welded during installation of the bracket onto the canister. Polypropylene is preferably used for the bracket, the same material typically used for capacitor canisters.

OTHER EMBODIMENTS

Other embodiments of the invention are within the scope of the following claims. The claims include a great many other arrangements of fasteners and/or brackets installed on the canister other than those shown in FIGS. 1–7 and 9–14. For example, the fasteners could be directly welded to the canister without the use of a bracket; adhesive could be used in place of ultrasonic welding; other polymers (e. g., polystyrene or nylon) could be used in place of polypropylene; a female fastener (or simply an opening) could be provided on the capacitor canister, to mate with projecting male fasteners on the equipment.

What is claimed is:

1. A capacitor in which a capacitive element is housed in a polymer canister, which is installed in equipment, comprising the polymer canister comprising a polymer wall surrounding the capacitive element;

at least one fastener supported on the exterior surface of the polymer wall, the fastener configured to attach the canister to the equipment in which the capacitor is to be installed wherein the fastener is a female fastener configured to mate with a male fastener attached to the equipment.

2. A capacitor in which a capacitive element is housed in a polymer canister, which is installed in equipment, comprising the polymer canister comprising a polymer wall surrounding the capacitive element;

at least one fastener supported on the exterior surface of the polymer wall, the fastener configured to attach the canister to the equipment in which the capacitor is to be installed wherein the fastener is a male fastener configured to mate with a female fastener attached to the equipment.

3. A capacitor in which a capacitive element is housed in a polymer canister, which is installed in equipment, comprising the polymer canister comprising a polymer wall surrounding the capacitive element;

a bracket adhered to the exterior surface of the polymer wall, the bracket configured to support at least one fastener configured to attach the canister to the equipment in which the capacitor is to be installed.

4. The capacitor of claim 3 wherein the fastener is a male fastener extending from the equipment, and the bracket has an opening configured to receive the fastener.

5. A capacitor in which a capacitive element is housed in a polymer canister, which is installed in equipment, comprising the polymer canister comprising a polymer wall surrounding the capacitive element;

at least one fastener supported on the exterior surface of the polymer wall, the fastener configured to attach the canister to the equipment in which the capacitor is to be installed, and a bracket adhered to the exterior surface, the bracket configured to support the at least one fastener.

6. The capacitor of claim 5 or 3 wherein the fastener is a male fastener and is attached to the bracket prior to installation of the capacitor in the equipment.

7. The capacitor of claim 6 wherein the bracket has at least one hole through which the at least one fastener extends, and the bracket has a cavity on its rear surface that which faces the canister wall, and the cavity is sized and configured to hold a head of the fastener.

8. The capacitor of claim 1, 5 or 3 wherein the fastener is a female fastener configured to mate with a male fastener attached to the equipment.

9. The capacitor of claim 2, or 3 wherein the canister has at least one curved surface, and the bracket is adhered to the curved surface.

10. The capacitor of claim 9 wherein the canister is approximately circular or oval in cross section, the bracket is elongated, and the long dimension of the bracket runs in the longitudinal direction of the cylinder.

11. The capacitor of claim 5 or 3, wherein the bracket is ultrasonically welded to the canister wall.

12. The capacitor of claim 5, or 3 wherein the bracket and polymer are primarily polypropylene.

13. The capacitor of claim 5 or 3 wherein the bracket comprises an opening for receiving a fastener configured to clamp the bracket to the equipment.

14. The capacitor of claim 5 or 3 wherein the bracket comprises a slot with a variable radial distance from the centerline of the canister, and wherein the slot is configured to receive a fastener and to cause the fastener to be forced radially against the wall of the slot when the canister is rotated about the centerline to move the fastener along the length of the slot.

15. The capacitor of claim 14 wherein at the end of the slot at which the slot is radially closest to the centerline of the canister the slot is wider than at the other end, thereby easing reception of the fastener within the slot.

16. The capacitor of claim 5 or 3 wherein at least one resilient element is included on the bracket, the element being configured to press against the equipment when the capacitor is installed to reduce vibration.

17. The capacitor of claim 16 wherein the resilient element comprises at least one wing-like element extending from the bracket.

* * * * *

UNITED STATES PATENT AND TRADEMARK OFFICE
CERTIFICATE OF CORRECTION

PATENT NO. : 6,556,425 B2
DATED : April 29, 2003
INVENTOR(S) : Martin Hudis, Glenn Grenier and David Jenkins It is certified that error appears in the above-identified patent and that said Letters Patent is hereby corrected as shown below:

<u>Column 5,</u>
Line 24, delete "1".
Line 27, "claim 2" should be -- claim 5 --.

Signed and Sealed this

Thirteenth Day of April, 2004

JON W. DUDAS
*Acting Director of the United States Patent and Trademark Office*